United States Patent
Weizman

(10) Patent No.: US 11,212,276 B2
(45) Date of Patent: Dec. 28, 2021

(54) SINGLE PAIRING FOR MULTIPLE TECHNOLOGIES

(71) Applicant: Intel Corporation, Santa Clara, CA (US)

(72) Inventor: Raz Weizman, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 15/200,288

(22) Filed: Jul. 1, 2016

(65) Prior Publication Data

US 2018/0007042 A1 Jan. 4, 2018

(51) Int. Cl.
| | |
|---|---|
| *H04L 29/06* | (2006.01) |
| *H04W 8/24* | (2009.01) |
| *H04L 29/08* | (2006.01) |
| *H04W 4/80* | (2018.01) |
| *H04W 92/18* | (2009.01) |

(52) U.S. Cl.
CPC ...... *H04L 63/0861* (2013.01); *H04L 63/0428* (2013.01); *H04L 63/06* (2013.01); *H04L 63/205* (2013.01); *H04L 67/104* (2013.01); *H04L 67/16* (2013.01); *H04W 4/80* (2018.02); *H04W 8/24* (2013.01); *H04W 92/18* (2013.01)

(58) Field of Classification Search
CPC ......... H04L 63/06; H04L 67/104; H04W 4/80
USPC .......................................................... 726/8
See application file for complete search history.

(56) References Cited

U.S. PATENT DOCUMENTS

| | | | | |
|---|---|---|---|---|
| 8,090,107 | B2* | 1/2012 | Little | H04L 9/0841 380/277 |
| 9,197,414 | B1* | 11/2015 | Martin | H04L 9/0822 |
| 2004/0073795 | A1* | 4/2004 | Jablon | H04L 9/0844 713/171 |
| 2007/0022058 | A1* | 1/2007 | Labrou | G06Q 20/32 705/67 |
| 2007/0287418 | A1* | 12/2007 | Reddy | H04W 12/00 455/410 |
| 2008/0152132 | A1* | 6/2008 | Sung | H04L 9/0841 380/44 |
| 2012/0030465 | A1* | 2/2012 | Bailey | H04W 76/10 713/168 |
| 2012/0210118 | A1* | 8/2012 | Chaves | G06F 21/6218 713/150 |

(Continued)

Primary Examiner — Dereena T Cattungal
(74) Attorney, Agent, or Firm — Schwegman Lundberg & Woessner, P.A.

(57) ABSTRACT

Various systems and methods for using single pairing for multiple technologies are provided herein. A system comprises a transceiver; a communication controller to interface with the transceiver and cause the transceiver to: connect to a remote device using a first protocol, the first protocol including a long term key for use in successive connections between the system and the remote device with the first protocol; and receive, from the remote device, a set of technologies supported by the remote device; and a security manager to: determine a set of common technologies; receive from the remote device, a set of tuples for each technology in the set of common technologies, each tuple comprising an identifier associated with the remote device for each technology and a corresponding technology; and create long term keys for use in later connections with the remote device using a technology from the set of technologies.

21 Claims, 5 Drawing Sheets

(56) References Cited

U.S. PATENT DOCUMENTS

| | | | | |
|---|---|---|---|---|
| 2015/0327133 A1* | 11/2015 | Yiu | ........................ | H04W 48/20 |
| | | | | 455/436 |
| 2015/0381668 A1* | 12/2015 | Kurabayashi | .......... | G06Q 10/10 |
| | | | | 709/204 |
| 2016/0294783 A1* | 10/2016 | Jover | ................... | H04L 63/0442 |
| 2017/0289735 A1* | 10/2017 | Rajapaksa | ............. | H04W 4/008 |

* cited by examiner

SINGLE PAIRING FOR MULTIPLE TECHNOLOGIES

TECHNICAL FIELD

Embodiments described herein generally relate to networking and in particular, to using single pairing for multiple technologies.

BACKGROUND

Bluetooth (e.g., IEEE 802.15.1-2002, published Jun. 14, 2002) is a widely used wireless technology used for point-to-point (P2P) connections between local devices. The Bluetooth technology includes two sub technologies: classic Bluetooth (Bluetooth) and Bluetooth Low Energy (BLE). Each sub technology is designed for different scenarios and use cases. Bluetooth is meant for use cases that require a relatively wide bandwidth such as voice, media and high throughput data connection, while BLE is meant for use cases with low throughput, close range, and low power requirements and usage.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Compute devices are becoming more complex and multi-functional. A smartphone may act as a sensor hub for a wearable device in a first instance, for example to gather biometric data, in which case the BLE protocol is a relevant communication standard to use. Then in a second instance, the smartphone may act as a media server to the wearable device, for example, to transfer voice, movies, video, or the like. Using multiple P2P connection technologies between two devices raises the issue of encryption for each connection. Many technologies support similar features of privacy, encryption, or authentication. As such, each connection may be secured using at least one of these modalities.

Disclosed herein are systems and methods that provide a simplified method to connect devices. In general, securing a connection with a sufficient security level involves some sort of key exchange phase where long term keys are generated, exchanged, and verified. In Bluetooth and BLE, for instance, this procedure is named pairing or bonding. For a high level of security, this procedure requires some sort of user intervention on at least one of the connecting devices. For example, a user may be required to read a passkey from one device and input it on another, approve the connection by pressing a button, or initiate the pairing scan. When this type of user intervention is multiplied across several technologies for the same two devices, the result is redundant activity and user annoyance.

Every technology has to perform its own securing connection procedure, such as Bluetooth pairing. There is no active mechanism to support the sharing of security from one technology to another. What is needed is a mechanism to securely share the long term keys or a derivative of these keys between different technologies in a device to eliminate the multiple key exchange for each technology between the same two devices. Such a mechanism represents an improvement to the networked devices by providing an efficient and secure method to establish connections. It may also significantly improve the user experience so that instead of having to secure multiple technologies between a pair of devices, the user would only have to secure one technology and the security (e.g., using the previously exchanged long term key) would waterfall to the rest of the technologies. Other advantages will become apparent in view of the continuing discussion.

Figure 1:
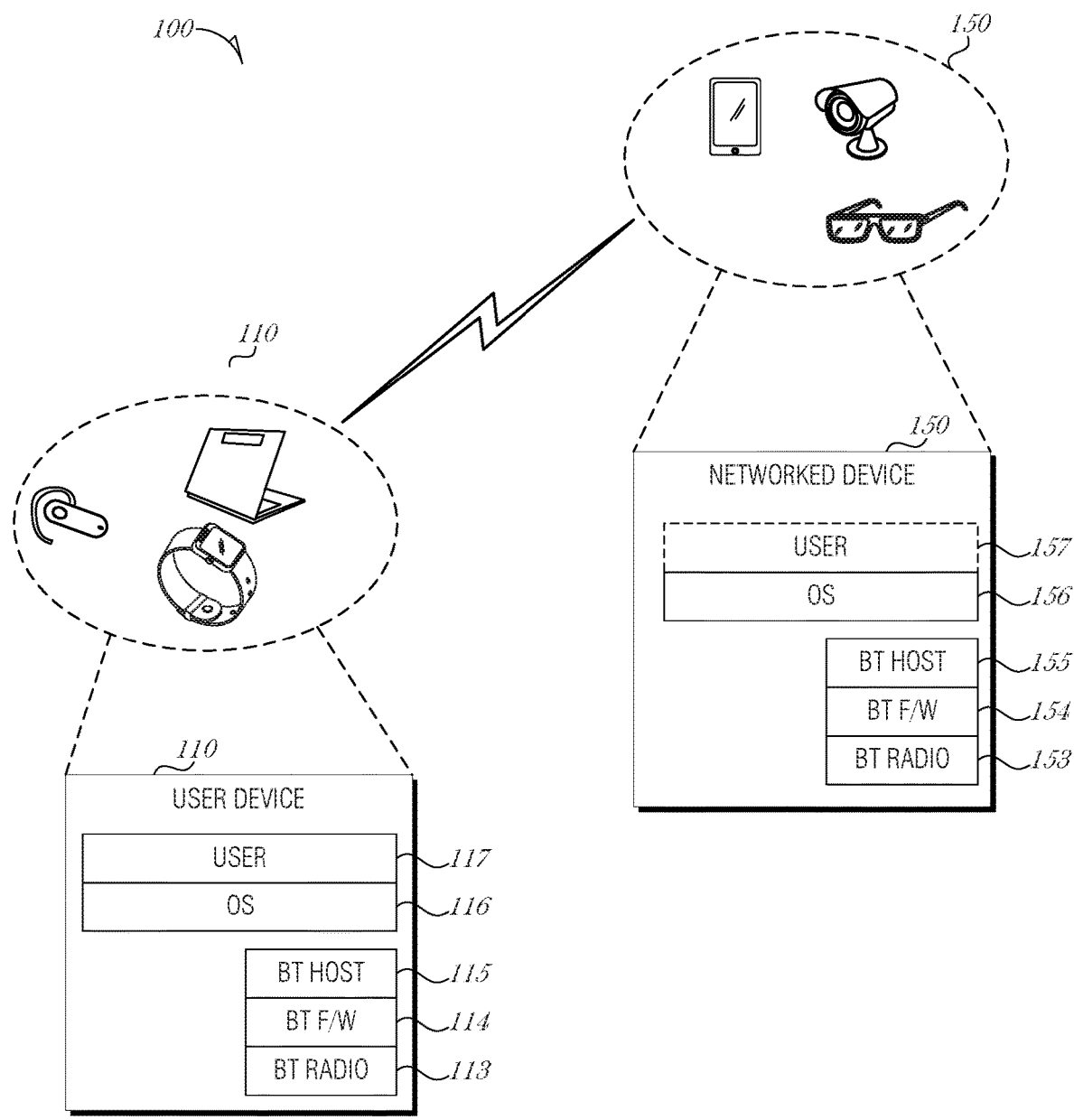
FIG. 1 is a schematic diagram illustrating an operating environment 100, according to an embodiment.

FIG. 1 is a schematic diagram illustrating an operating environment 100, according to an embodiment. The operating environment 100 includes a user device 110 and a networked device 150. The user device 110 may be any type of compute device including, but not limited to a smartphone, a laptop, a hybrid computer, a tablet, a phablet, a smartwatch, or other similar suitable devices that allow a user to initiate connection with the networked device 150. The networked device 150 includes, but is not limited to any type of device capable of performing a compute function and connecting over a Bluetooth or BLE connection. Examples include consumer goods (e.g., televisions, refrigerators, washing machines, computer printers, audio systems, smartphones, fire alarms, baby monitors, home automation devices, etc.), manufacturing devices, retail devices (e.g., shopping carts, price scanners, inventory systems, etc.), public works (e.g., gas meters, fire hydrants, street lights, etc.), personal devices (e.g., wearable devices, smart glasses, e-textiles, smartphones, laptops, tablets, etc.), or other suitable devices.

Bluetooth connection techniques differ slightly between classic Bluetooth and BLE. In classic Bluetooth, the procedure for forming connections is asymmetrical, where one Bluetooth device acts as a pager while the other Bluetooth device scans for pages. The procedure is targeted so that the page is responded to only by the specified Bluetooth device scanning for pages.

In contrast, in BLE, a device that transmits advertising packets is referred to as an advertiser and devices that receive advertising packets on the advertising channels with intent to connect to an advertiser are known as initiators. When an initiator receives an advertising packet of interest, then the initiator may request a connection over the same advertising radio frequency (RF) channel on which it received the connectable advertising packet. Devices that receive advertising on the advertising channel without the intention of connecting are referred to as scanners and are outside of the scope of this discussion. An initiator may make a request to connect to the advertiser, and once the connection is established, the initiator is referred to as the master, while the advertiser is referred to as the slave. The master controls aspects of the master-slave communication.

In general though, for two Bluetooth devices to communicate to one another, the two devices discover one another (e.g., via paging), and then once they are able to communicate, they may perform an authentication process (e.g., pairing exchange). The pairing exchange is to exchange security features, such as input/output capabilities and available security mechanisms on each device. After the pairing features are exchanged and the connection is encrypted (e.g., pairing), then the long term keys (LTK) may be exchanged for the current and later communication sessions. Two devices that have exchanged LTKs are then able to initiate an encrypted communication session without re-pairing. The devices store the LTKs for use the next time they want to form a connection. This state is referred to as "bonded" where storing the keys is the act of bonding. Bonded devices automatically re-establish a connection whenever they are close enough. Thus, bonds are created through one-time a process called pairing and when devices pair up, they share addresses, names, and profiles, and store them in memory. The devices also share a common secret key (e.g., LTK), which allows them to bond whenever they are together in the future.

It is understood that while examples and embodiments are described using the BLE nomenclature, the systems and methods described herein may also be applied to Bluetooth or any other communication standard.

Both the user device 110 and networked device 150 include Bluetooth hardware, firmware, and software to enable Bluetooth connectivity. The user device 110 includes a Bluetooth radio 113 controlled by Bluetooth firmware 114 and Bluetooth host 115. Similarly, the networked device 150 includes a Bluetooth radio 153 controlled by Bluetooth firmware 154 and Bluetooth host 155. Operating systems 116, 156 interface with the respective Bluetooth hosts 115, 155. Examples operating systems 116, 156 include desktop operating systems, embedded operating systems, real-time operating systems, proprietary operating systems, network operating systems, and the like. Examples include, but are not limited to Windows NT (and its variants), Windows Mobile, Windows Embedded, UNIX, Android™, JavaOS, Symbian OS, Linux, and other suitable operating system platforms.

A communication controller (not shown) may be implemented in hardware, firmware, or in the operating system 116, 156 of the respective device. The communication controller may act as an interface with various hardware abstraction layer (HAL) interfaces, such as device drivers, communication protocol stacks, libraries, and the like. The communication controller is operable to receive user input (e.g., from a system event or by an express system call to the communication controller), and interact with one or more lower-level communication devices (e.g., Bluetooth radio, cellular radio, infrared emitter, millimeter wave transceiver, etc.) based on the user input. The communication controller may be implemented, at least in part, in a user-level application that makes calls to one or more libraries, device interfaces, or the like, to cause communication devices to operate in a certain manner.

A user application space 117, 157 on the user device 110 and optionally on the networked device 150, are used to implement user-level applications, controls, user interfaces, and the like, for a user to control the respective device. An application, app, extension, control panel, or other user-level executable software program may be used to initiate the signal to then, in turn, initiate Bluetooth connection protocols.

It is understood that other peer-to-peer protocols may be used instead of Bluetooth or BLE, such as Wi-Fi Direct, WiGig, or ZigBee. In such configurations, alternatively configured radios may be used along with the appropriate pairing or connection protocols.

The present disclosure describes a mechanism to securely share the long term keys (LTKs), or a derivative of these keys, between different technologies in pairs of devices. Using this mechanism, the pair of devices are able to avoid having to exchange multiple keys (e.g., pair multiple times) for each technology between the pair of devices. This mechanism improves the function of the devices by securing multiple technologies based off of one security exchange. That is, a single technology pairing may be leveraged into a multiple technology bondings between two devices.

The LTK in BLE is similar to the link key used in Classic Bluetooth; each is a persistent key that is stored in both devices and used to derive a fresh encryption key each time the devices establish an encrypted connection. For the purposes of the present discussion, the general term "long term key" will be used to refer to a persistent key used in any protocol to establish an encrypted or secure connection.

Figure 2:
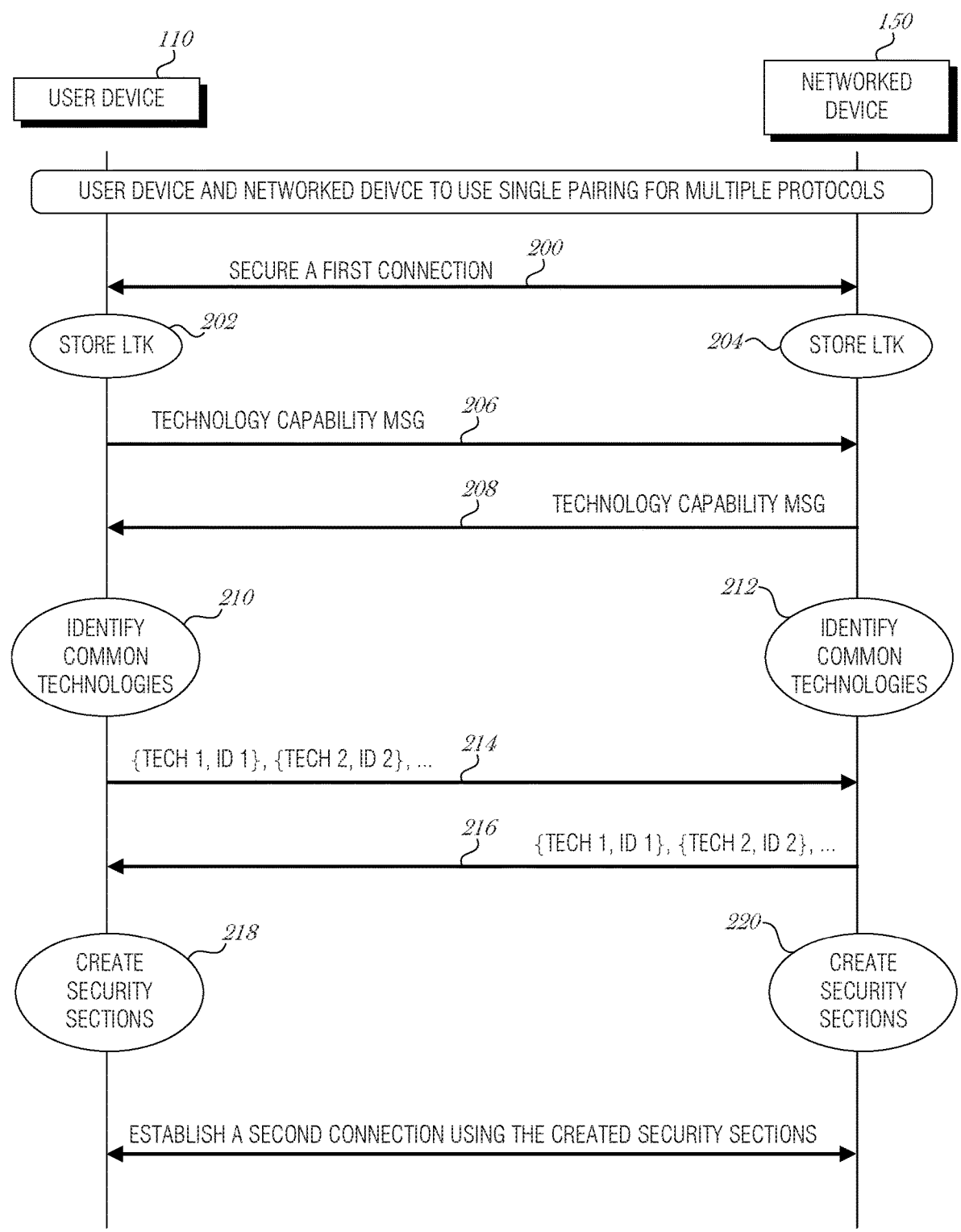
FIG. 2 is a swim lane diagram illustrating message traffic between the user device and the networked device, according to an embodiment.

FIG. 2 is a swim lane diagram illustrating message traffic between the user device 110 and the networked device 150, according to an embodiment. At 200, the user device 110 and networked device 150 establish a first secured connection. The connection may be established using a BLE pairing protocol, for example. Each device 110, 150 stores a long term key (operation 202 and 204 respectively) obtained from the exchange. After the conventional pairing over BLE, the devices 110, 150 exchange technology capability messages 206, 208. The technology capability messages 206, 208 describe the respective device's available networking technologies. The technology capability messages may be a bitmap, with each bit of the bitmap representing a technology and the value of the bit representing whether the technology is supported by the respective device. The bitmap may include five bits for the technologies [Bluetooth, BLE, Wi-Fi Direct, WiGig, Zigbee]. Thus, a bitmap of 11011 would indicate that Bluetooth, BLE, WiGig, and Zigbee are supported by the device in question. With two devices' bitmaps of supported technologies, a bitwise AND operation may be performed to determine the common supported technologies amongst two or more devices.

Thus, continuing the example as illustrated in FIG. 2, a technology capability message 206 may indicate that the user device 110 is capable of using Bluetooth, BLE, and WiGig (e.g., bitmap 11001). The technology capability message 208 from the networked device 150 may indicate that the supported technologies are Bluetooth, BLE, and Wi-Fi Direct (e.g., bitmap 11100). Based on this data, each device 110, 150 is able to determine the capabilities of the other and identify common technologies (operations 210, 212) (e.g., 11011 AND 11100 is 11000, indicating that only Bluetooth and BLE are common technologies).

After identifying common shared technologies, each device 110, 150 transmits the identifiers for each of the shared technologies to the other device (operations 214, 216). For example, both user device 110 and networked device 150 are able to communicate using Bluetooth and BLE. As such, identifiers for each technology may be exchanged; the user device 110 may send a Bluetooth identifier and a BLE identifier to the networked device 150, and vice versa. The user device 110 and networked device 150 may not exchange a BLE identifier, as it is already known being that the initial connection was created using BLE. However, for simplicity of design, the devices 110, 150 may exchange all identifiers of overlapping, shared communication protocols, even if they may already be known between the devices.

Identifiers may be machine addresses (e.g., MAC address), a Bluetooth Device Identifier that is provisioned under the Bluetooth specification (e.g., 48-bit Bluetooth device address obtained from the IEEE Registration Authority), or other unique identifier (UID) assigned to the device. Alternatively, the UID may be an arbitrary UID, provided by another authority.

Once exchanged, each device 110, 150 will then use the identifier(s) provided by the other device and create the appropriate security sections in the shared protocols (operations 218, 220). For example, the user device 110 may obtain the Bluetooth classic Bluetooth Device Identifier (BDI) from the networked device 150. The first LTK may be altered to provide the security data for the second (or later) communication protocols. In this instance, the BLE LTK may be altered using a function provided in the Bluetooth protocol. The Bluetooth Specification Version 4.2, Volume 3, Part H, Section 2.4.2.4 and Section 2.4.2.5 provides a function to derive a Basic Rate/Enhanced Data Rate (BR/EDR) Link Key (Bluetooth LTK) from a BLE LTK, and a function to derive a BLE LTK from a BR/EDR Link Key, respectively.

Section 2.4.2.4, noted above, provides that the LTK from a BLE physical transport may be converted to a BR/EDR link key for the BR/EDR transport as follows, using intermediate link key (ILK) as an intermediate value:

1. ILK=h6(LTK, "tmp1")
2. BR/EDR link key=h6(ILK, "lebr")

where "lebr" is mapped into the array keyID[ ] using extended ASCII as follows:

keyID[0]=0111 0010
keyID[1]=0110 0010
keyID[2]=0110 0101
keyID[3]=0110 1100
keyID=0x6c656272

The string "tmp1" is mapped into keyID[ ] using extended ASCII as follows:

keyID[0]=0011 0001
keyID[1]=0111 0000
keyID[2]=0110 1101
keyID[3]=0111 0100
keyID=0x746D7031

Section 2.4.2.5 provides that the BR/EDR link key from the BR/EDR physical transport may converted to the LTK for the BLE transport as follows, using intermediate long term key (ILTK) as an intermediate value:

1. ILTK=h6(Link Key, "tmp2")
2. LTK=h6(ILTK, "brle")

The string "brle" is mapped into keyID[ ] using extended ASCII as follows:

keyID[0]=0110 0101
keyID[1]=0110 1100
keyID[2]=0111 0010
keyID[3]=0110 0010
keyID=0x62726c65

The string "tmp2" is mapped into keyID[ ] using extended ASCII as follows:

keyID[0]=0011 0010
keyID[1]=0111 0000
keyID[2]=0110 1101
keyID[3]=0111 0100
keyID=0x746D7032

As such, using the functions described in the Bluetooth Specification, Sections 2.4.2.4 and 2.4.2.5, a device (e.g., user device 110) may first establish a Bluetooth connection and then create a BLE bond without performing the BLE pairing, or first establish a BLE connection and then create a Bluetooth bond without performing Bluetooth pairing.

When the Bluetooth discovery between the devices lead to a Bluetooth connection, the devices would appear to have already paired and are now bonded, because they each hold the long term key for securing the connection for this specific BDI address. Therefore, no additional pairing or key exchange would be required. In this example, the user is spared the need to interact with both devices to create two connections. Further, security may be increased as additional over-the-air key exchange information for each technology is avoided. This example using the Bluetooth and BLE technologies can be extended to other P2P technologies such as Wi-Fi Direct, WiGig, ZigBee and others.

When needed then, the two devices 110, 150 are able to establish a second connection using a second protocol, which is different from the first connection's protocol (operation 222). The second connection is based on the stored security sections that were created in operations 218 and 220.

Figure 3:
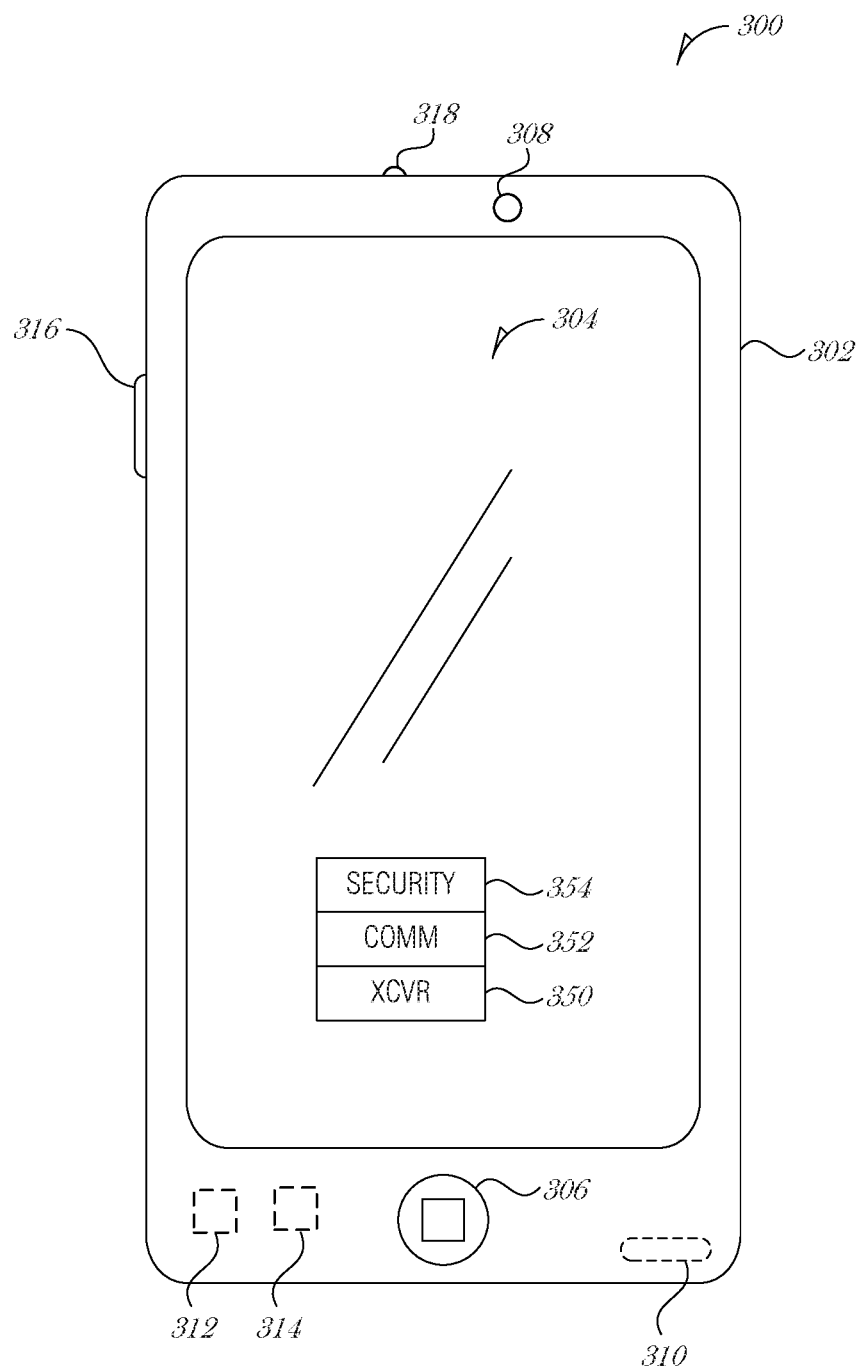
FIG. 3 is a block diagram illustrating a user device, according to an embodiment.

FIG. 3 is a block diagram illustrating a user device 300, according to an embodiment. The user device 300 is illustrated as a smartphone in this example, through it will be understood that user device 300 is representative of other types of computing devices, which may have more or fewer component, devices, or other features than exemplary user device 300. User device 300 has a housing 302 that encloses the interior components. The housing 302 may provide access to the interior of device 300 to some degree. For instance, in devices with a user-replaceable battery, flash memory card, or subscriber identity module (SIM) card, the housing 302 may include a user-removable cover. In devices having a design that does not facilitate user access to the interior, housing 302 may nonetheless have a provision for permitting access to technicians so that certain components may be repaired or replaced if needed.

User device 300 further includes a touchscreen 304, which may form a part of the overall enclosure of device 300 in cooperation with housing 302. The touchscreen 304 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, the user device 300 includes a user input device 306, which in this example represents one or more user-operable input devices, such as button(s), keypad, keyboard, trackpad, mouse, etc.

As further depicted in FIG. 3, the user device 300 has several data capture devices, such as sensing transducers, the physical stimulation of which produces signaling that may be sampled, digitized, and stored as captured data. The camera 308 includes an image sensor, along with additional hardware for digitizing, processing, and storing portions of the image sensor output. The camera 308 also includes optics that may form a portion of the housing 302. The camera 308 may record still images, motion video, or both.

A microphone 310 includes audio capture circuitry that samples, digitizes, and stores portions of the signaling produced by the microphone 310 in response to sensed acoustic stimulus. The microphone 310 is typically activated together with the camera 308 when the user device 300 is operated to record videos.

Additional sensors in the user device 300 include an accelerometer 312 with a multi-axis sensor that produces signaling in response to changes in motion, and electronics to sample and digitize that signaling, and a magnetometer 314 with sensors and supporting circuitry that detect the direction and intensity of the ambient magnetic field, or any externally-applied magnetic fields.

The user device 300 includes a transceiver 350 disposed in a housing of the system 300. The user device 300 also includes a communication controller 352 to interface with the transceiver 350 and cause the transceiver 350 to connect to a remote device using a first protocol, the first protocol including a long term key for use in successive connections between the system and the remote device with the first protocol. The transceiver 350 may be further operable to receive, from the remote device, a set of technologies supported by the remote device.

A security manager 354 is disposed in the user device 300 and is operable to determine a set of common technologies between a set of technologies supported by the system and the set of technologies supported by the remote device. In an embodiment, the set of technologies supported by the remote device and the set of technologies supported by the system 300 are represented with respective bitmaps, and wherein to determine the set of common technologies between the first and second set of technologies, the security manager 354 is to perform a bitwise logical AND operation on the respective bitmaps.

The security manager 354 may be further operable to receive from the remote device, a set of tuples for each technology in the set of common technologies, each tuple comprising an identifier associated with the remote device for each technology and a corresponding technology.

The security manager 354 may be further operable to create long term keys from the long term key for each identifier in the received set of tuples, (e.g., for the set of common technologies), for use in later connections with the remote device using a technology from the set of technologies. In an embodiment, to create long term keys from the received set of tuples, the security manager 354 is to invoke a function to convert the long term key received for the first protocol to a long term key associated with the technology from the set of common technologies.

In an embodiment, the communication controller 352 is to cause the transceiver 350 to transmit the set of technologies supported by the system 300 to the remote device. This operation allows the remote device to perform similar operations and determine which technologies are shared between the system 300 and the remote device.

In an embodiment, the communication controller 352 is to cause the transceiver 350 to transmit, to the remote device, a tuple of an identifier associated with the system 300 and a corresponding technology, for each technology in the set of common technologies. This operation allows the remote device to perform similar operations and store derived long term keys for the system 300, for later communication sessions.

In an embodiment, the first protocol comprises Bluetooth and the set of common technologies comprises Bluetooth Low Energy. In a related embodiment, the first protocol comprises Bluetooth Low Energy and the set of common technologies comprises Bluetooth.

Figure 4:
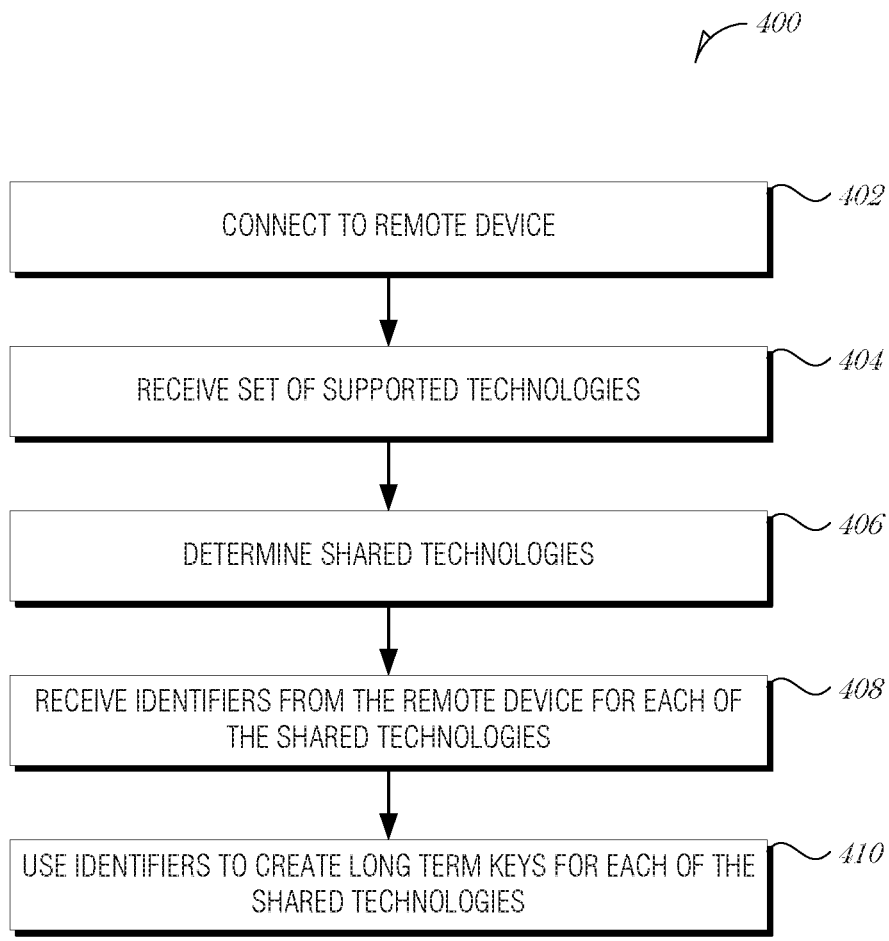
FIG. 4 is a flowchart illustrating a method for using single pairing for multiple technologies, according to an embodiment.

FIG. 4 is a flowchart illustrating a method 400 for using single pairing for multiple technologies, according to an embodiment. At block 402, a remote device is connected to using a first protocol, the first protocol including a long term key for use in successive connections between the system and the remote device with the first protocol.

At block 404, a set of technologies supported by the remote device is received from the remote device.

At block 406, a set of common technologies between a set of technologies supported by the system and the set of technologies supported by the remote device is determined. In an embodiment, the set of technologies supported by the remote device and the set of technologies supported by the system are represented with respective bitmaps, and wherein determining the set of common technologies between the first and second set of technologies comprises performing a bitwise logical AND operation on the respective bitmaps.

At block 408, a set of tuples for each technology in the set of common technologies, is received from the remote device, each tuple comprising an identifier associated with the remote device for each technology and a corresponding technology.

At block 410, long term keys are created from the long term key for each identifier in the received set of tuples, (e.g., for the set of common technologies), for use in later connections with the remote device using a technology from the set of technologies. In an embodiment, creating long term keys from the received set of tuples comprises invoking a function to convert the long term key received for the first protocol to a long term key associated with the technology from the set of common technologies.

In an embodiment, the method 400 includes transmitting the set of technologies supported by the system to the remote device.

In an embodiment, the method 400 includes transmitting, to the remote device, a tuple of an identifier associated with the system and a corresponding technology, for each technology in the set of common technologies.

In an embodiment, the first protocol comprises Bluetooth and the set of common technologies comprises Bluetooth Low Energy. In a related embodiment, the first protocol comprises Bluetooth Low Energy and the set of common technologies comprises Bluetooth.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 5:
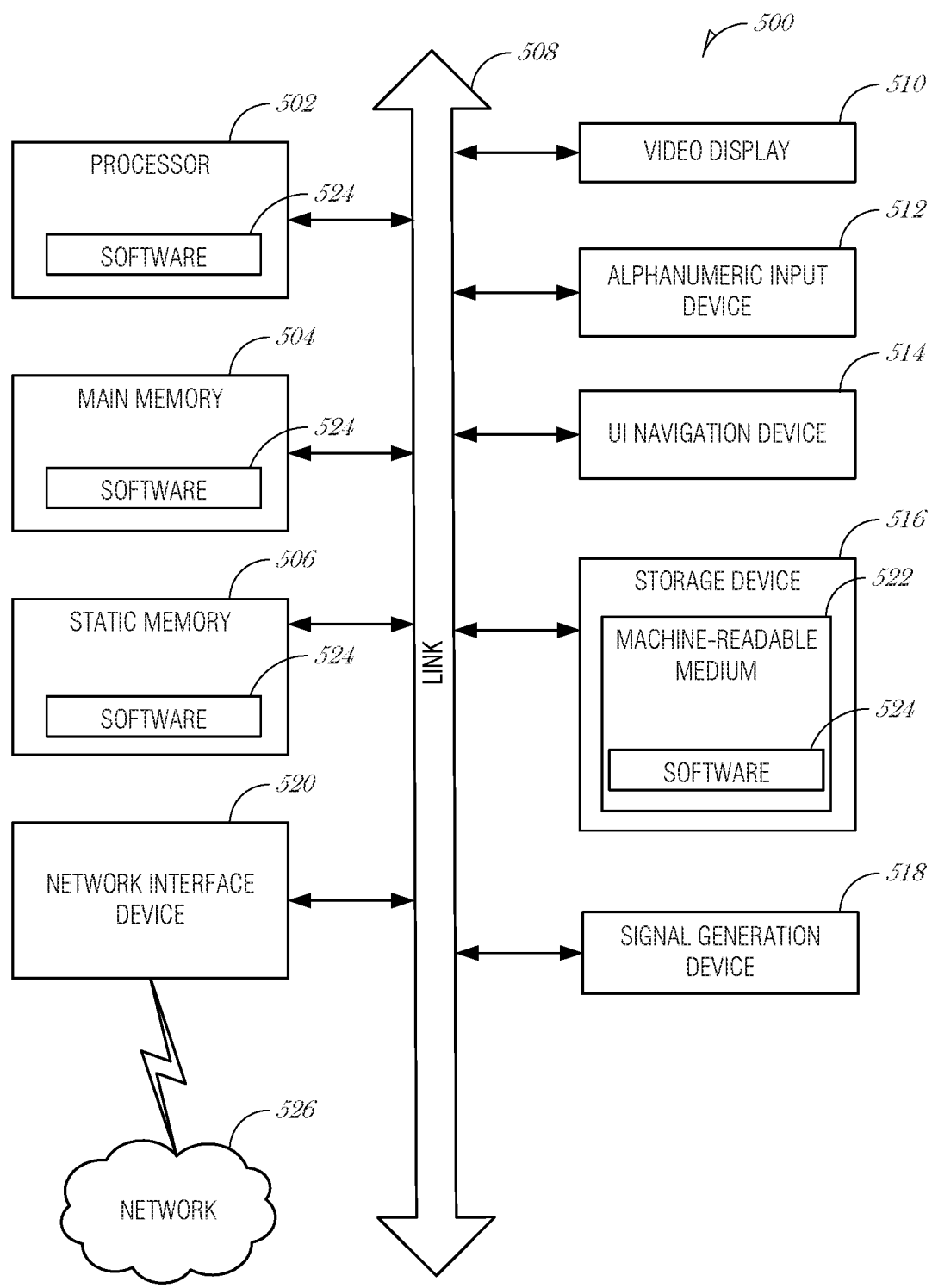
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for using single pairing for multiple technologies (such as a device, apparatus, or machine) comprising: a transceiver disposed in a housing of the system; a communication controller to interface with the transceiver and cause the transceiver to: connect to a remote device using a first protocol, the first protocol including a long term key for use in successive connections between the system and the remote device with the first protocol; and receive, from the remote device, a set of technologies supported by the remote device; and a security manager to: determine a set of common technologies between a set of technologies supported by the system and the set of technologies supported by the remote device; receive from the remote device, a set of tuples for each technology in the set of common technologies, each tuple comprising an identifier associated with the remote device for each technology and a corresponding technology; and create long term keys from the long term key for each identifier in the received set of tuples, for use in later connections with the remote device using a technology from the set of technologies.

In Example 2, the subject matter of Example 1 may include, wherein the communication controller is to cause the transceiver to transmit the set of technologies supported by the system to the remote device.

In Example 3, the subject matter of any one of Examples 1 to 2 may include, wherein the communication controller is to cause the transceiver to transmit, to the remote device, a tuple of an identifier associated with the system and a corresponding technology, for each technology in the set of common technologies.

In Example 4, the subject matter of any one of Examples 1 to 3 may include, wherein the first protocol comprises Bluetooth and the set of common technologies comprises Bluetooth Low Energy.

In Example 5, the subject matter of any one of Examples 1 to 4 may include, wherein the first protocol comprises Bluetooth Low Energy and the set of common technologies comprises Bluetooth.

In Example 6, the subject matter of any one of Examples 1 to 5 may include, wherein the set of technologies supported by the remote device and the set of technologies supported by the system are represented with respective bitmaps, and wherein to determine the set of common technologies between the first and second set of technologies, the security manager is to perform a bitwise logical AND operation on the respective bitmaps.

In Example 7, the subject matter of any one of Examples 1 to 6 may include, wherein to create long term keys from the received set of tuples, the security manager is to invoke a function to convert the long term key received for the first protocol to a long term key associated with the technology from the set of common technologies.

Example 8 includes subject matter for using single pairing for multiple technologies (such as a method, means for performing acts, machine readable medium including instructions that when performed by a machine cause the machine to performs acts, or an apparatus to perform) comprising: connecting to a remote device using a first protocol, the first protocol including a long term key for use in successive connections between the system and the remote device with the first protocol; receiving, from the remote device, a set of technologies supported by the remote device; determining a set of common technologies between a set of technologies supported by the system and the set of technologies supported by the remote device; receiving from the remote device, a set of tuples for each technology in the set of common technologies, each tuple comprising an identifier associated with the remote device for each technology and a corresponding technology; and creating long term keys from the long term key for each identifier in the received set of tuples, for use in later connections with the remote device using a technology from the set of technologies.

In Example 9, the subject matter of Example 8 may include, transmitting the set of technologies supported by the system to the remote device.

In Example 10, the subject matter of any one of Examples 8 to 9 may include, transmitting, to the remote device, a tuple of an identifier associated with the system and a corresponding technology, for each technology in the set of common technologies.

In Example 11, the subject matter of any one of Examples 8 to 10 may include, wherein the first protocol comprises Bluetooth and the set of common technologies comprises Bluetooth Low Energy.

In Example 12, the subject matter of any one of Examples 8 to 11 may include, wherein the first protocol comprises Bluetooth Low Energy and the set of common technologies comprises Bluetooth.

In Example 13, the subject matter of any one of Examples 8 to 12 may include, wherein the set of technologies supported by the remote device and the set of technologies supported by the system are represented with respective bitmaps, and wherein determining the set of common technologies between the first and second set of technologies comprises performing a bitwise logical AND operation on the respective bitmaps.

In Example 14, the subject matter of any one of Examples 8 to 13 may include, wherein creating long term keys from the received set of tuples comprises invoking a function to convert the long term key received for the first protocol to a long term key associated with the technology from the set of common technologies.

Example 15 includes at least one machine-readable medium including instructions, which when executed by a machine, cause the machine to perform operations of any of the Examples 8-14.

Example 16 includes an apparatus comprising means for performing any of the Examples 8-14.

Example 17 includes subject matter for using single pairing for multiple technologies (such as a device, apparatus, or machine) comprising: means for connecting to a remote device using a first protocol, the first protocol including a long term key for use in successive connections between the system and the remote device with the first protocol; means for receiving, from the remote device, a set of technologies supported by the remote device; means for determining a set of common technologies between a set of technologies supported by the system and the set of technologies supported by the remote device; means for receiving from the remote device, a set of tuples for each technology in the set of common technologies, each tuple comprising an identifier associated with the remote device for each technology and a corresponding technology; and means for creating long term keys from the long term key for each identifier in the received set of tuples, for use in later connections with the remote device using a technology from the set of technologies.

In Example 18, the subject matter of Example 17 may include, means for transmitting the set of technologies supported by the system to the remote device.

In Example 19, the subject matter of any one of Examples 17 to 18 may include, means for transmitting, to the remote device, a tuple of an identifier associated with the system and a corresponding technology, for each technology in the set of common technologies.

In Example 20, the subject matter of any one of Examples 17 to 19 may include, wherein the first protocol comprises Bluetooth and the set of common technologies comprises Bluetooth Low Energy.

In Example 21, the subject matter of any one of Examples 17 to 20 may include, wherein the first protocol comprises Bluetooth Low Energy and the set of common technologies comprises Bluetooth.

In Example 22, the subject matter of any one of Examples 17 to 21 may include, wherein the set of technologies supported by the remote device and the set of technologies supported by the system are represented with respective bitmaps, and wherein the means for determining the set of common technologies between the first and second set of technologies comprise means for performing a bitwise logical AND operation on the respective bitmaps.

In Example 23, the subject matter of any one of Examples 17 to 22 may include, wherein the means for creating long term keys from the received set of tuples comprise means for invoking a function to convert the long term key received for the first protocol to a long term key associated with the technology from the set of common technologies.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for using single pairing for multiple technologies, the system comprising:
   a transceiver disposed in a housing of the system;
   a communication controller to interface with the transceiver and cause the transceiver to:
     connect to a remote device using a first protocol, the first protocol including a first long term key for use in successive connections between the system and the remote device with the first protocol; and
     receive, from the remote device, a set of technologies supported by the remote device, the set of technologies including the first protocol and a second protocol; and a security manager to:
   determine a set of common technologies between a set of technologies supported by the system and the set of technologies supported by the remote device, the set of common technologies including the first protocol and the second protocol;
   receive from the remote device, a set of tuples for each technology in the set of common technologies, each tuple comprising an identifier associated with the remote device for each technology and a corresponding technology; and
   create a set of second long term keys from the first long term key for each identifier in the received set of tuples, for use in later connections with the remote device using a technology from the set of technologies.

2. The system of claim 1, wherein the communication controller is to cause the transceiver to transmit the set of technologies supported by the system to the remote device.

3. The system of claim 1, wherein the communication controller is to cause the transceiver to transmit, to the remote device, a tuple of an identifier associated with the system and a corresponding technology, for each technology in the set of common technologies.

4. The system of claim 1, wherein the first protocol comprises Bluetooth and the set of common technologies comprises Bluetooth Low Energy.

5. The system of claim 1, wherein the first protocol comprises Bluetooth Low Energy and the set of common technologies comprises Bluetooth.

6. The system of claim 1, wherein the set of technologies supported by the remote device and the set of technologies supported by the system are represented with respective bitmaps, and wherein to determine the set of common technologies, the security manager is to perform a bitwise logical AND operation on the respect bitmaps.

7. The system of claim 1, wherein to create the set of second long term keys from the received set of tuples, the security manager is to invoke a function to convert the first long term key received for the first protocol to a respective second long term key in the set of second long term keys, the respective second long term key associated with the technology from the set of common technologies.

8. A method for using single pairing for multiple technologies on a system, the method comprising:
    connecting to a remote device using a first protocol, the first protocol including a first long term key for use in successive connections between the system and the remote device with the first protocol;
    receiving, from the remote device, a set of technologies supported by the remote device, the set of technologies including the first protocol and a second protocol;
    determining a set of common technologies between a set of technologies supported by the system and the set of technologies supported by the remote device, the set of common technologies including e first protocol and the second protocol;
    receiving from the remote device, a set of tuples for each technology in the set of common technologies, each tuple comprising an identifier associated with the remote device for each technology and a corresponding technology; and
    creating a set of second long term keys from the first long terra key for each identifier in the received set of tuples, for use in later connections with the remote e using a technology from the set of technologies.

9. The method of claim 8, further comprising transmitting the set of technologies supported by the system to the remote device.

10. The method of claim 8, further comprising transmitting, to the remote device, a tuple of an identifier associated with the system and a corresponding technology, for each technology in the set of common technologies.

11. The method of claim 8, wherein the first protocol comprises Bluetooth and the set of common technologies comprises Bluetooth Low Energy.

12. The method of claim 8, wherein the first protocol compromises Bluetooth Low Energy and the set of common technologies comprises Bluetooth.

13. The method of claim 8 wherein the set of technologies supported by the remote device and the set of technologies supported by the system are represented with respective bitmaps, and wherein determining the set of common technologies comprises performing a bitwise logical AND operation on the respective bitmaps.

14. The method of claim 8, wherein creating the set of second long term keys from the received set of tuples comprises invoking a function to convert the first long term key received for the first protocol to a respective second long term key in the set of second long term keys, the respective second long term key associated with the technology from the set of common technologies.

15. At least one non-transitory machine-readable medium including instructions for using single pairing for multiple technologies on a system, which when executed by a machine, cause the machine to:
    connect to a remote device using a first protocol, the first protocol including a first long term key for use in successive connections between the system and the remote device with the first protocol;
    receive, from the remote device, a set of technologies supported by the remote device, the set of technologies including the first protocol and a second protocol;
    determine a set of common technologies between a set of technologies supported by the system and the set of technologies supported by the remote device, the set of common technologies including the first protocol and the second protocol;
    receive from the remote device, a set of tuples for each technology in the set of common technologies, each tuple comprising an identifier associated with the remote device for each technology and a corresponding technology; and
    create a set of second long term keys from the first long term key for each identifier in the received set of tuples, for use in later connections with the remote device using a technology the set of technologies.

16. The non-transitory machine-readable medium of claim 15, further comprising the instructions to transmit the set of technologies supported by the system to the remote device.

17. The non-transitory machine-readable medium of claim 15, further comprising the instructions to transmit, to the remote device, a tuple of an identifier associated with the system and a corresponding technology, for each technology in the set of common technologies.

18. The non-transitory machine-readable medium of claim 15, wherein the first protocol comprises Bluetooth and the set of common technologies comprises Bluetooth Low Energy.

19. The non-transitory machine-readable medium of claim 15, wherein the first protocol comprises Bluetooth Low Energy and the set of common technologies comprises Bluetooth.

20. The non-transitory machine-readable medium of claim 15, wherein the set of technologies supported by the remote device and the set of technologies supported by the system are represented with respective bitmaps, and wherein the instructions to determine the set of common technologies comprise instructions to perform a bitwise logical AND operation on the respective bitmaps.

21. The non-transitory machine-readable medium of claim 15, wherein the instructions to create the set of second long term keys from the received set of tuples comprise instructions to invoke a function to convert the first long term key received for the first protocol to a respective second long term key in the set of second long term keys, the respective second long term key associated with the technology from the set of common technologies.

* * * * *

UNITED STATES PATENT AND TRADEMARK OFFICE
CERTIFICATE OF CORRECTION

PATENT NO. : 11,212,276 B2  
APPLICATION NO. : 15/200288  
DATED : December 28, 2021  
INVENTOR(S) : Raz Weizman Page 1 of 1

It is certified that error appears in the above-identified patent and that said Letters Patent is hereby corrected as shown below:

In the Claims

In Column 14, Line 36, in Claim 1, after "and", insert a linebreak

In Column 15, Line 4, in Claim 6, delete "respect" and insert --respective-- therefor In Column 15, Line 24, in Claim 8, delete "e" and insert --the-- therefor In Column 15, Line 32, in Claim 8, delete "terra" and insert --term-- therefor In Column 15, Line 33, in Claim 8, delete "e" and insert --device-- therefor In Column 15, Line 46, in Claim 12, delete "compromises" and insert --comprises-- therefor In Column 15, Line 48, in Claim 13, after "8", insert --,--

In Column 16, Line 26, in Claim 15, after "technology", insert --from--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*